3,027,707
ROCKET PROPULSION METHOD USING 1,1,3-TRI-METHYL-3-CYCLOHEXYLHYDRINDANE

Lawrence O. Miller, Glassboro, John W. Schick, Merchantville, and Robert L. McLaughlin, Woodbury, N.J., assignors to Socony Mobil Oil Company Inc., a corporation of New York
No Drawing. Filed June 18, 1959, Ser. No. 821,126
2 Claims. (Cl. 60—35.4)

This invention relates to rocket propulsion and is more specifically concerned with a novel propellant for rocket engines.

As is well known in the art, a rocket propellant is the mixture of rocket fuel and oxidizer that is burned in the firing chamber. The mixture known as the propellant is usually made just prior to the entry into the firing chamber or in situ in the chamber itself. In the former case, the fuel and the oxidizer enter a common tube and are injected into the firing chamber through a common nozzle. In the latter case, separate nozzle streams of fuel and of oxidizer enter the firing chamber to mix therein just prior to being burned.

In order to carry sufficient energy for take-off and flight, rockets must carry rather large amounts of propellant. As a result, rockets are greatly increased in size for a given payload to a point where they become massive and unwieldy. Thus, any means of reducing the size of the rocket for a given amount of energy carried could be beneficial in making it more wieldy and in reducing its total weight.

In many cases, however, the desideratum is to increase the range of a rocket of a given size. In such a case, the rocket is "space-limited," i.e., there is no room for additional fuel. Thus, additional range must result from the fuel itself.

It is a discovery of this invention that potential reduction of rocket propellant volume can be effected by using a novel propellant that comprises an oxidizer and a certain hydrocarbon fuel of high energy content per volume, i.e., high B.t.u. per gallon. It is a further discovery that the range of space-limited rockets can be increased by the use of this novel propellant.

Accordingly, it is an object of this invention to provide improved rocket propulsion. Another object is to provide a novel rocket propellant. A specific object is to provide a propellant mixture of an oxidizer and a fuel of high energy content per volume. Another specific object is to provide a means to decrease rocket size and weight for a given energy output. A further specific object is to provide a method for increasing the range of a space-limited rocket. Other objects and advantages of this invention will become apparent to those skilled in the art, from the following detailed description.

This invention provides a means of operating a rocket engine wherein the rocket propellant is a mixture of 1,1,3-trimethyl-3-cyclohexylhydrindane and an oxidizer therefor.

The oxidizers utilizable in rocket propellants are often oxygen-containing materials, but generally can be materials that combine with a fuel to liberate heat energy. Typical oxidizers are liquid oxygen, liquid ozoen, hydrogen peroxide, fuming nitric acid, oxygen difluoride, and liquid fluorine.

The fuel used in the novel propellant of this invention is 1,1,3-trimethyl-3-cyclohexylhydrindane. This material is readily prepared by hydrogenating, by usual hydrogenation methods, 1,1,3-trimethyl-3-phenylindane. The latter can be prepared most feasibly by dimerizing alpha-methylstyrene to the cyclic dimer. Several methods of making the cyclic dimer are known, but a very efficient method is described in copending application Serial No. 803,080 filed March 31, 1959. It will be recognized, however, that the manner of preparing the fuel contemplated herein is not a limiting factor of this invention, as any method of preparation or any source of the material can be used.

As a fuel, 1,1,3-trimethyl-3-cyclohexylhydrindane has a high energy content. It contains 18,292 B.t.u per pound and 143,236 B.t.u. per gallon at 60° F. It is the high B.t.u. per gallon that makes it attractive as a space-saving fuel. It has an API gravity of 19.0° and a viscosity of 28.59 cs. at 100° F. and, accordingly, is readily pumpable. The combination of this fuel with an oxidizer can increase the range of a rocket, as is demonstrated in the following example.

Example

In order to compare the performance of the propellant of this invention, calculations of the performance of two identical rockets was made. In one case, the fuel was butylcyclohexane, a typical rocket fuel. In the other case, the fuel was 1,1,3-trimethyl-3-cyclohexylhydrindane. In both cases, the oxidant was liquid oxygen. To maintain the comparison on an even basis, the performance of each rocket was determined at an assumed steady flow combustion at 500 p.s.i.a. (34 atmospheres), with a fuel/oxygen ratio 50 percent rich in fuel. In each case, the dry rocket weight, the total volume of propellant (fuel plus oxygen), and the expansion nozzle were the same. Thus, the two rockets were identical except for distribution of tank volume between fuel and oxygen.

The performance data for a vertical flight, disregarding air resistance, are set forth in the following table. In this table, the data in column A are for butylcyclohexane (125,001 B.t.u. per gallon) and those in column B are for 1,1,3-trimethyl-3-cyclohexylhydrindane.

| Performance Factor | A | B |
|---|---|---|
| Specific impulse, lb. force/lb. wt./sec | 270 | 265 |
| Takeoff wt., lbs | 81,040 | 84,470 |
| Propellant wt., lbs | 56,250 | 59,680 |
| Fuel wt., lbs | 17,130 | 18,430 |
| Oxygen wt., lbs | 39,120 | 41,250 |
| Rocket vel. @ burnout, ft./sec | 5,520 | 5,230 |
| Combustion time, sec | 150 | 162.5 |
| Altitudes attained, miles | 133 | 181 |

The performance data in the table reveal the improved performance of the propellant of this invention. It will be noted that, when using 1,1,3-trimethyl-3-cyclohexylhydrindane as fuel, even though the takeoff weight is higher than in the rocket of A, the altitude attained is considerably greater. In this case, it is 36 percent greater. In terms of horizontal flight, the distance travelled using the propellant of this invention would be greater by this same order of magnitude.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for producing thrust, that comprises simultaneously introducing separate streams of an oxidizer selected from the group consisting of liquid oxygen, liquid ozone, hydrogen peroxide, fuming nitric acid, oxygen difluoride, and liquid fluorine, and a fuel component of a bipropellant into contact with each other in a firing chamber of a rocket engine in such proportions to produce ignition, said fuel component comprising 1,1,3-trimethyl-3-cyclohexylhydrindane.

2. The method of claim 1, wherein said oxidizer is liquid oxygen.

References Cited in the file of this patent

UNITED STATES PATENTS

| | | |
|---|---|---|
| 2,530,493 | Van Loenen | Nov. 21, 1950 |
| 2,712,497 | Fox | July 5, 1955 |